G. P. BOSWORTH.
GLOVE KNITTING MACHINE.
APPLICATION FILED APR. 8, 1920.

1,413,452.

Patented Apr. 18, 1922.
8 SHEETS—SHEET 1.

Inventor:
George P. Bosworth,
by Emery, Booth, Janney & Varney
Attys.

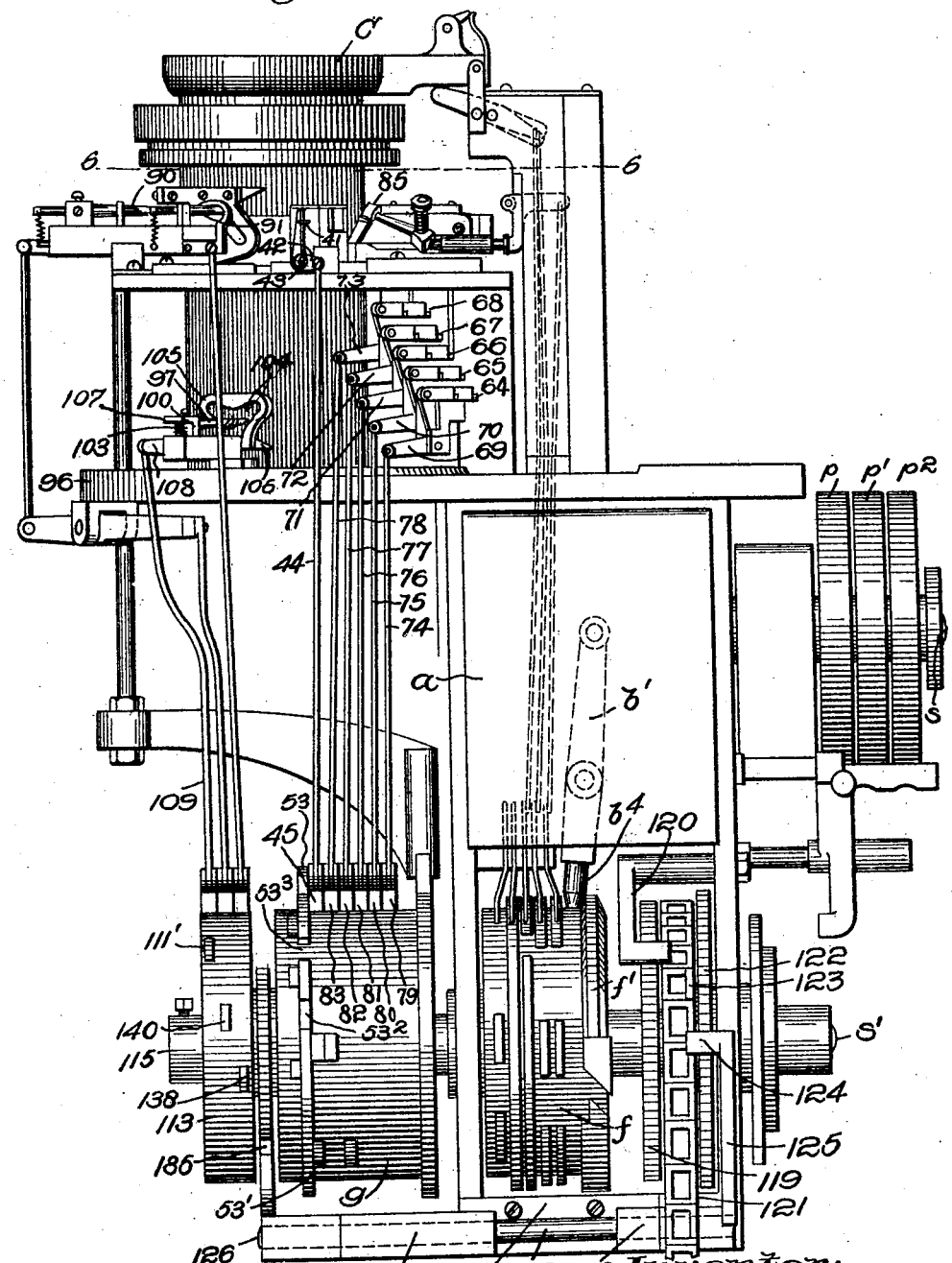

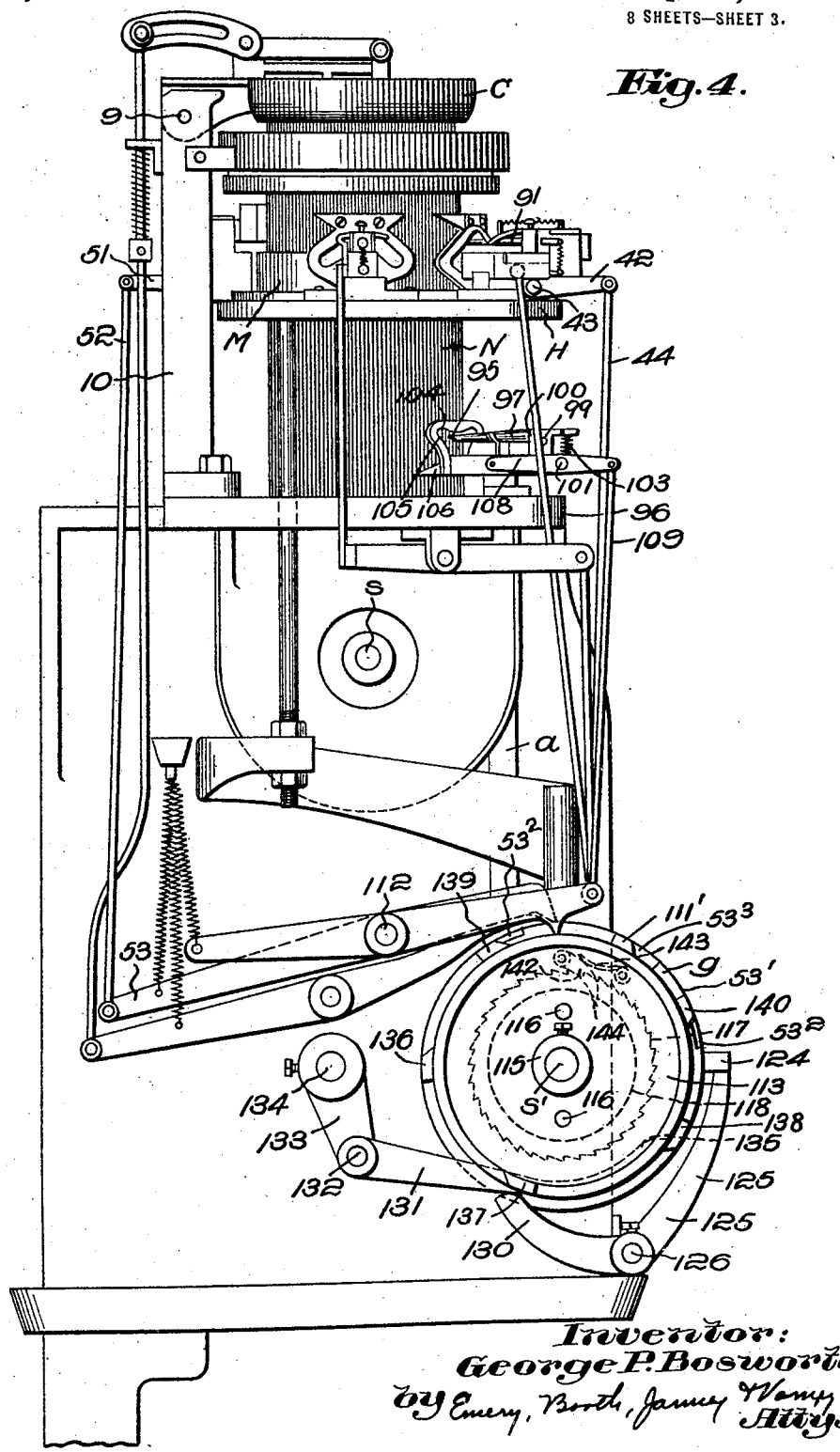

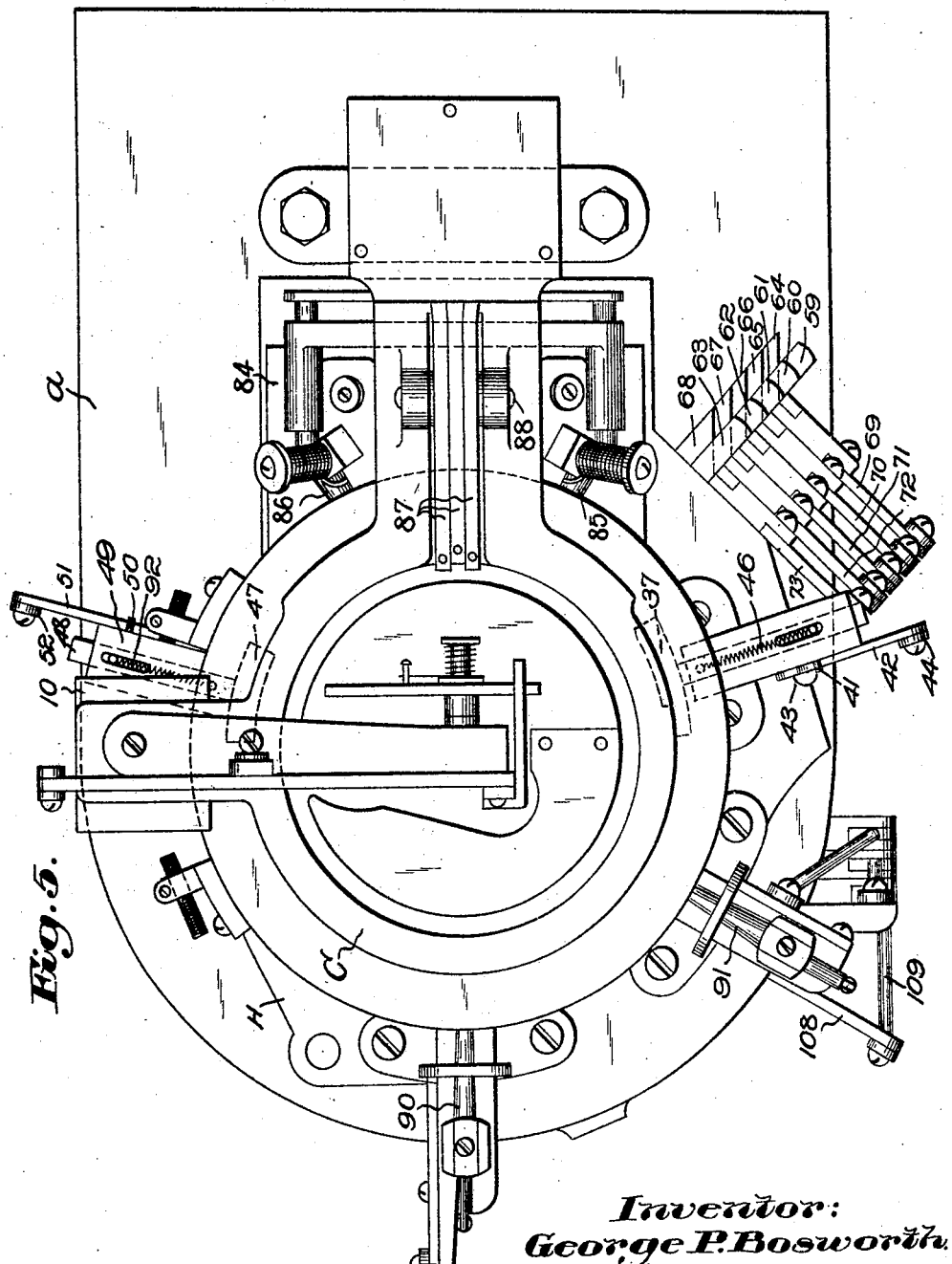

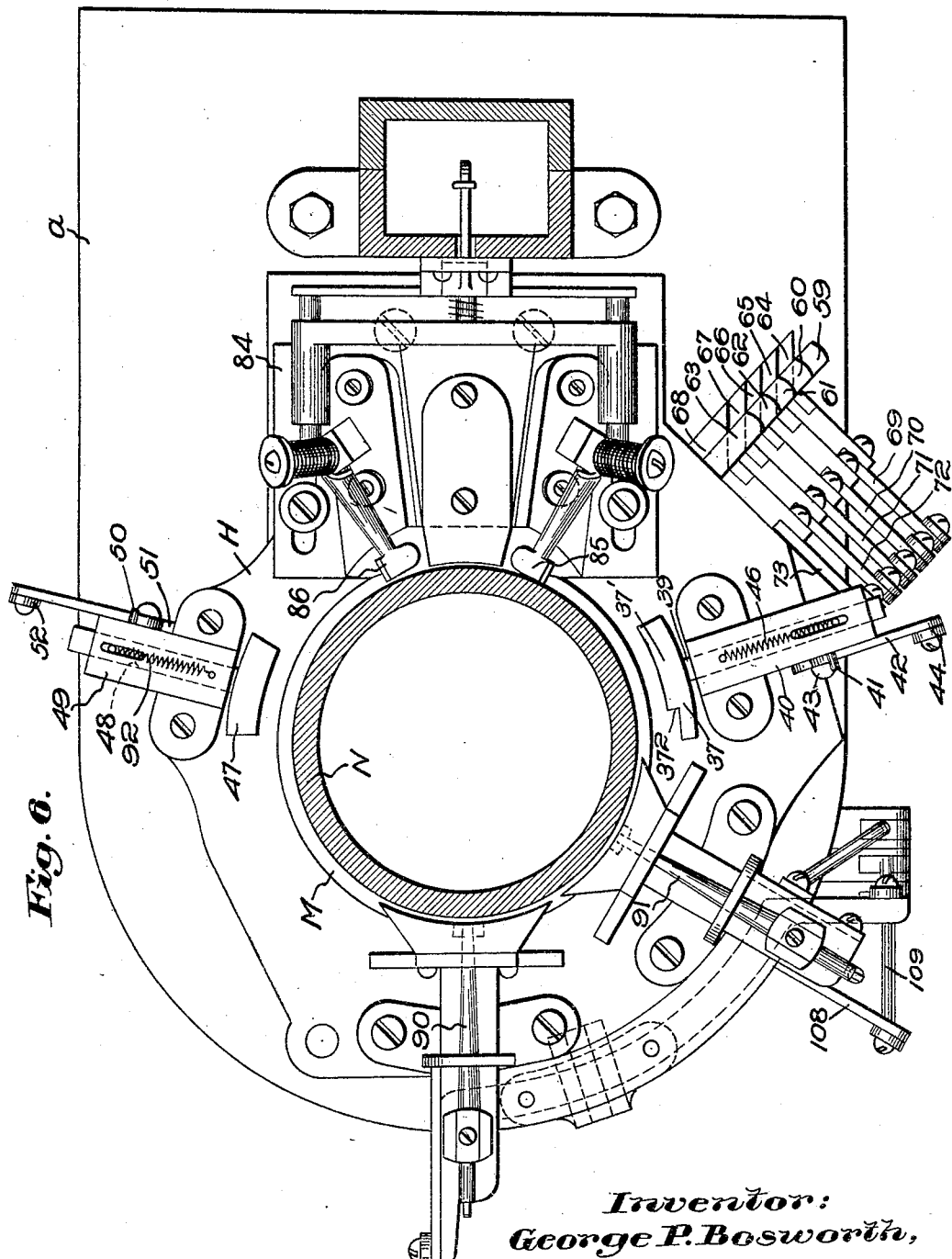

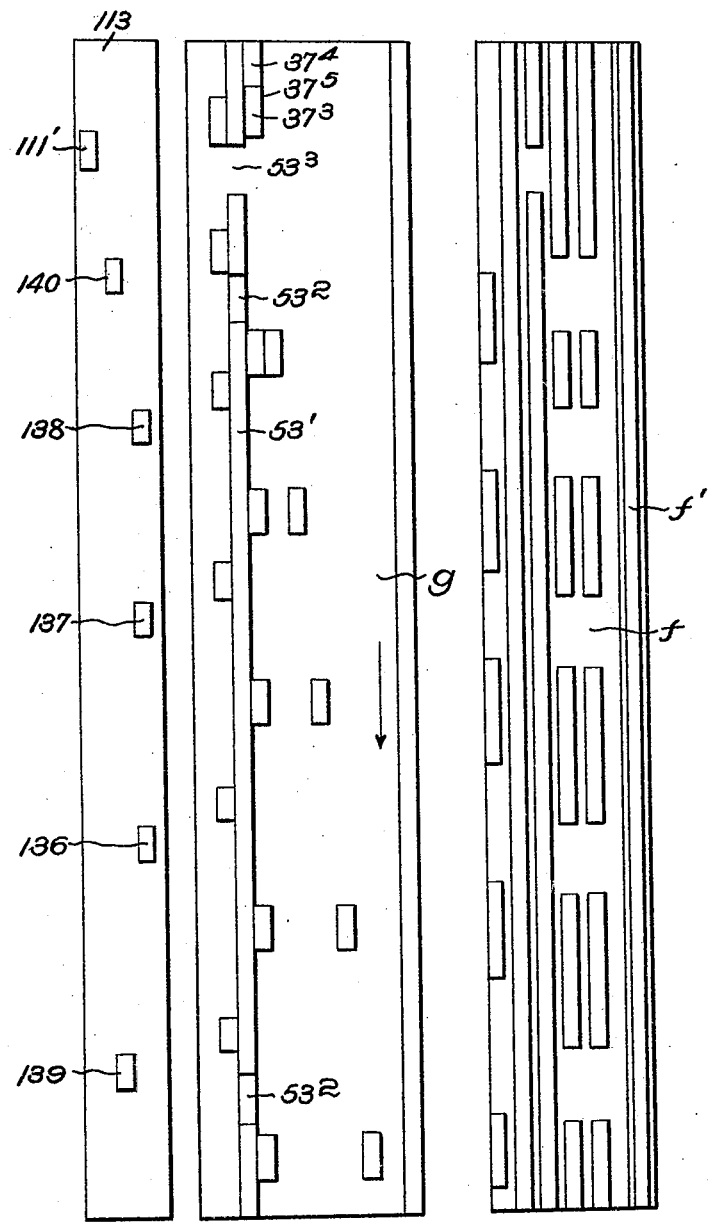

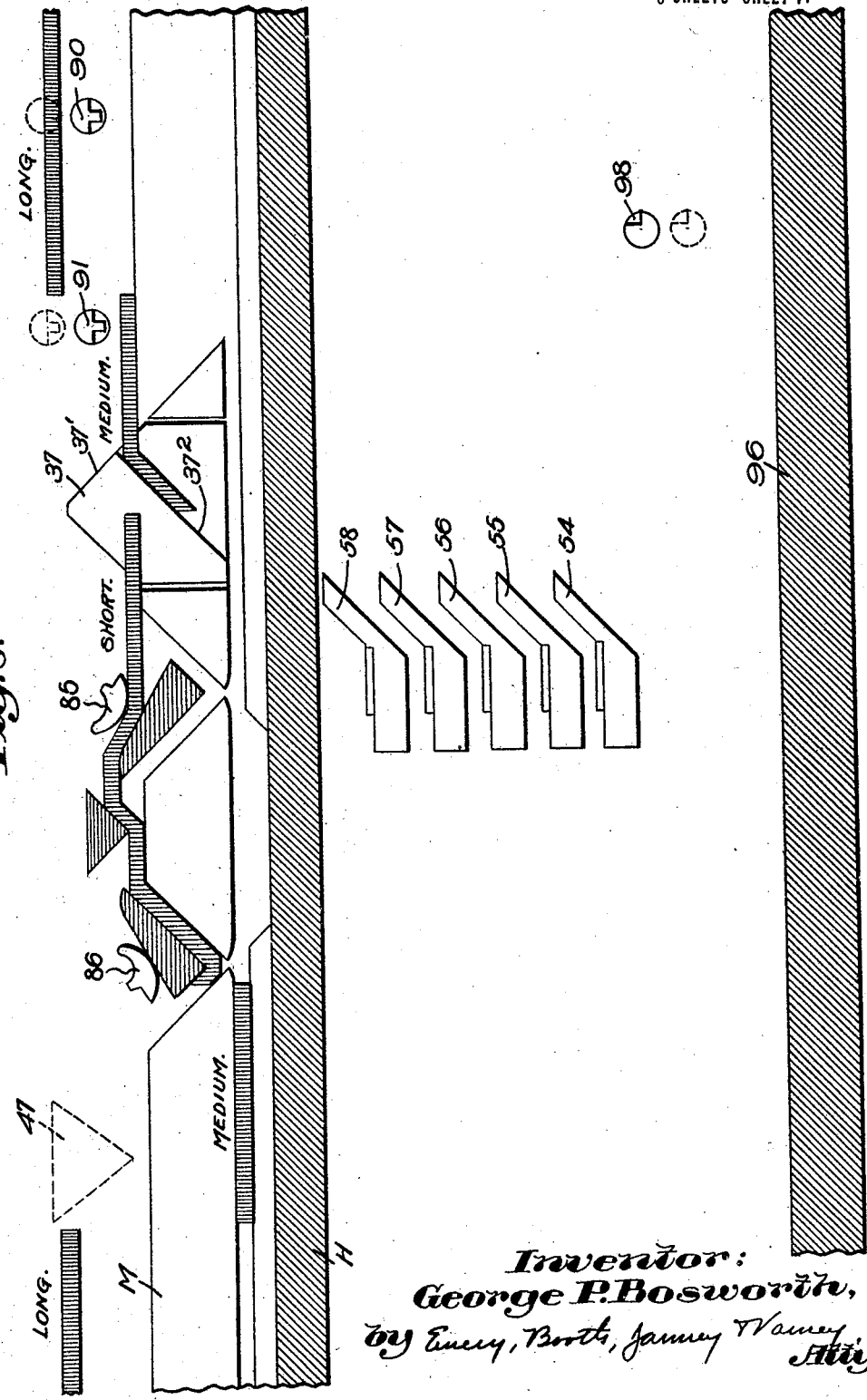

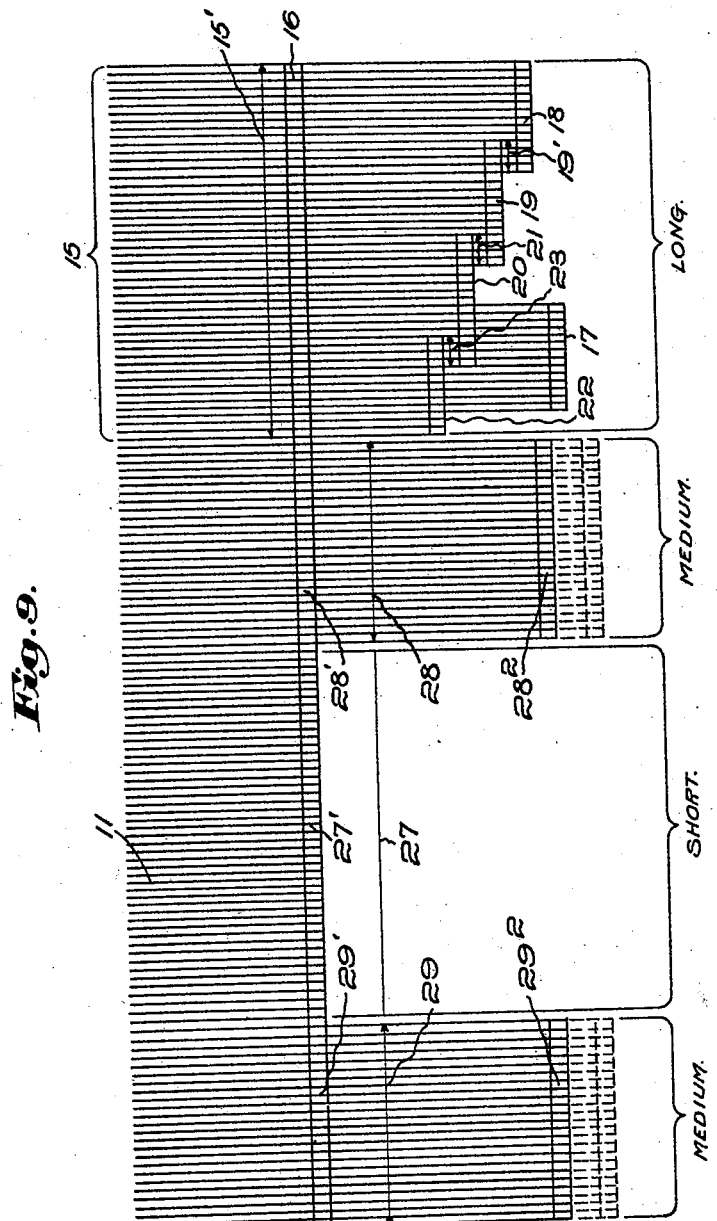

UNITED STATES PATENT OFFICE.

GEORGE P. BOSWORTH, OF CENTRAL FALLS, RHODE ISLAND, ASSIGNOR TO HEMPHILL COMPANY, OF CENTRAL FALLS, RHODE ISLAND, A CORPORATION OF MASSACHUSETTS.

GLOVE-KNITTING MACHINE.

1,413,452.   Specification of Letters Patent.   Patented Apr. 18, 1922.

Application filed April 8, 1920. Serial No. 372,347.

*To all whom it may concern:*

Be it known that I, GEORGE P. BOSWORTH, a citizen of the United States, and a resident of Central Falls, in the county of Providence and State of Rhode Island, have invented an Improvement in Glove-Knitting Machines, of which the following description, in connection with the accompanying drawings, is a specification, like characters on the drawings representing like parts.

This invention relates to machines for knitting glove blanks or similar articles and is an improvement over the machine disclosed in my co-pending application Serial No. 233,301, filed May 8, 1918.

In the accompanying drawings I have, for the purposes of illustration only, disclosed a machine embodying the characteristics of my invention and examples of work that may be formed thereon, wherein,—

Fig. 3 is a front elevation of the machine;

Fig. 4 is a left-hand side elevation thereof;

Fig. 5 is a plan view of the machine;

Fig. 6 is a horizontal section upon the line 6—6 of Fig. 3;

Fig. 7 is a diagram indicating the cams for operating the various instrumentalities of the knitting head;

Fig. 8 is a development of the knitting cams, non-knitting cams, and the cams for selecting the needles that are to form the thumb, fingers and fashioned wrist, respectively; and Fig. 9 is a development of the full complement of needles indicating the relative positions of the needle and jack butts for the several groups into which the series of needles is divided to produce the finger, thumb, hand strip and fashioned wrist portions of the glove.

Figure 1:
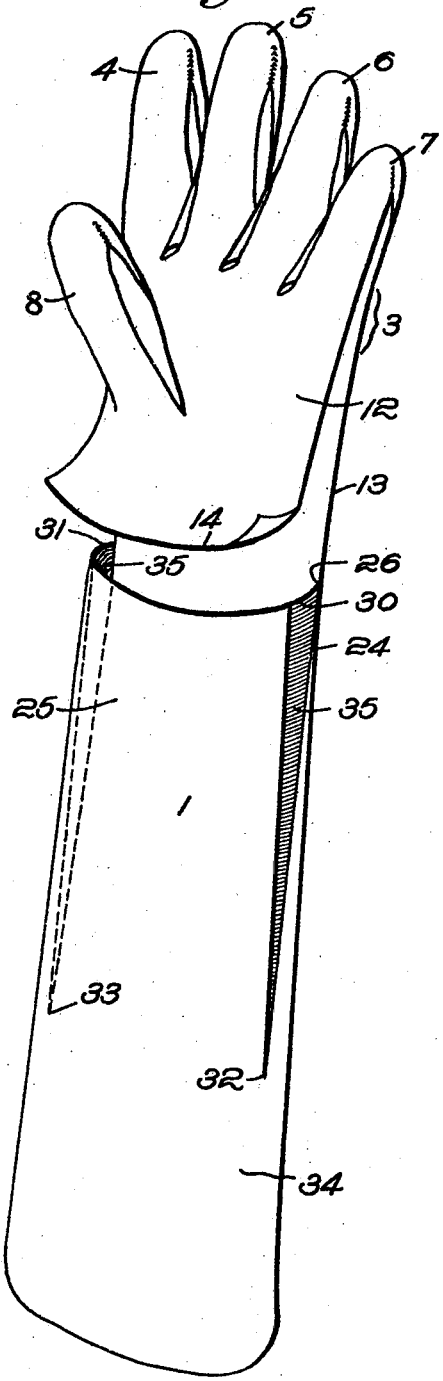
Fig. 1 is a perspective view of a glove blank adapted to be knitted upon the machine embodying this invention.
Figure 2:
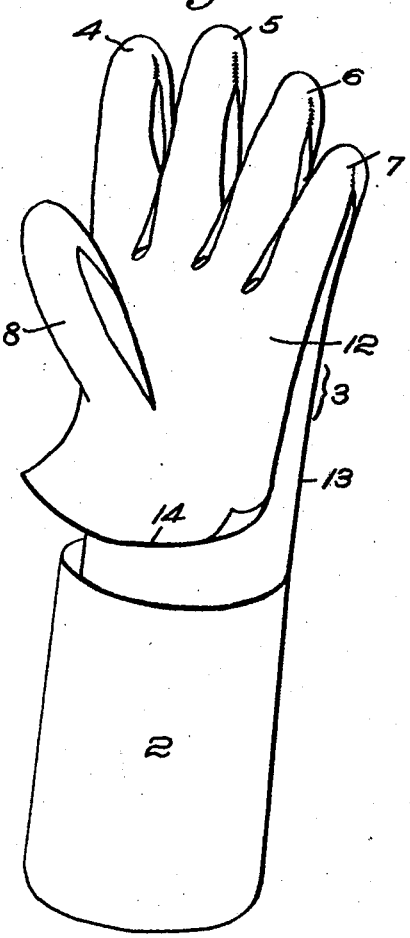
Fig. 2 is a perspective view of another form of glove blank adapted to be knitted upon said machine.

In the drawings I have, for convenience, shown the features of my invention applied to that general type of knitting machine disclosed in the patent to Hemphill No. 933,443, dated September 7, 1909, for circular, automatic, stocking machines, but with such modifications as will enable the machine to knit various types of gloves, such, for example, as I have illustrated in Figs. 1 and 2, and wherein like parts are given like numbers. The wrists 1 and 2, respectively, of said figures are of tubular formation. The hand coverings 3 are of strip formation selvaged at opposite edges. The finger coverings 4, 5, 6 and 7, indicating the first, second, third and fourth fingers, respectively, and the thumb covering 8, also consist of narrow, selvaged strips, said hand and finger coverings being formed during the reciprocating movements of the cylinder or needle carrier, and the wrist sections during the rotary movement thereof. It will, however, be obvious that the machine is capable of producing a variety of knitted articles, and I do not limit it to the formation of the particular types of glove blanks shown.

As certain general parts of the mechanism shown may be, and preferably are, the same as those shown in said Hemphill patent, I have designated such parts by the same reference characters that are employed in said patent. Thus I have indicated the frame of the machine at $a$, the revoluble needle cylinder N, the non-revoluble cam carrier H, and the annular portion or ledge of said cam carrier is marked M. The pulleys for the driving belt are marked, respectively, $p$, $p'$, $p^2$ (quick speed, slow speed and loose), and at $s$ is indicated the main shaft upon which said pulleys are mounted. The pattern shaft is indicated at $s'$, and upon this shaft are mounted the pattern and cam drums $f$ and $g$. $f'$ is the pattern ring on the drum or barrel $f$ which engages the member $b^4$ carried by the clutch-shifting lever $b'$ to control said lever and for maintaining said lever in a position to produce reciprocating or rotary knitting. The details of the mechanism controlled by the pattern ring $f'$ through which the needle cylinder is reciprocated for flat or reciprocating knitting, or in a continuously rotating manner for tubular knitting, may be, and preferably are, the same as in the said Hemphill Patent No. 933,443, and are unnecessary to be shown herein.

A latch ring C is pivoted at one side of the needle cylinder, as at 9 (see Fig. 4), and upon the upright 10 in a manner common to the Hemphill construction. The machine includes a circular series of knitting instrumentalities 11, herein latch needles, and the machine is equipped to operate in a rotary or a reciprocating manner for the purposes hereinafter set forth. When rotating, nearly the entire complement of needles is employed for a certain number of courses and the full complement is employed during other courses to knit, for example, the tubular section 1 of the glove blank shown in Fig. 1. The reciprocating movements of the cylinder are used to effect the knitting upon a plurality of said needles of the front and back hand coverings 12 and 13, respectively, preferably in the form of a selvaged strip, and furthermore said reciprocating movements may be employed to effect the knitting of narrow, selvaged strips upon certain selected groups of needles to produce the digit and thumb coverings of the blank.

Assuming that a glove blank of the type shown in Fig. 1 is to be knitted upon the machine, it will be obvious that knitting may begin at any desired portion of said blank. It is, however, assumed that the knitting begins at the lower end 14 of the palm or front hand covering 12, this knitting preferably being effected by reciprocating knitting upon only a portion of the needles of the series, for example, one-third of said needles, which group is indicated at 15 in Fig. 9, the knitting butts 16 of said group being preferably long butts. Reciprocating knitting continues in the production of the selvaged strip constituting the front hand covering 12, until the base line of the thumb 8 is reached. If the thumb strip is to be knit integral with said hand strip, as herein shown, all of the needles of the group 15 will at this point be withdrawn from action, with the exception of a small group 17 upon which said thumb strip is knitted by reciprocating knitting.

Having completed the formation of said thumb strip, the remaining needles of the group 15 may then be restored to action and knitting continued to form the palm of said front hand covering to the base line of the fingers. When this line is reached, knitting may proceed upon one or more desired groups to form, in the desired sequence, the fingers 4, 5, 6 and 7, herein upon the group of needles 18 which produce the selvaged strip constituting the little finger 7. Previous to the knitting of this strip, however, all the needles are preferably, though not necessarily, withdrawn from action by suitable cams hereinafter described, and the particular group of needles, namely the group 18, is then restored to action to effect the knitting of said strip. Upon completion of the strip constituting said little finger, a similar operation takes place and the needles of a second group are brought into action, preferably the group 19 of the third finger 6, a portion of the needles of this group, as indicated at 19', having been previously employed in effecting the knitting of the group 18, thus producing a gusset between the fourth and third fingers. Upon completion of the knitting of said third finger strip, knitting may then be effected in a similar manner upon the group 20 to produce the second finger 5, and portions of the needles in this group consisting of certain of the needles of the group 19, as shown at 21, so as to form a gusset between the third and second fingers. The next step in the operation is preferably to produce upon another group of needles, namely the group 22, a selvaged strip constituting the first finger 4, this group also employing the series 23 of needles which previously constituted a portion of the group 20, thereby producing a gusset between the second and first fingers, the several strips so formed being double the length of the fingers, and these strips are later folded and opposite adjacent edges thereof stitched or seamed together to form the completed fingers of the glove.

Following the completion of the last digit strip, as just described, knitting may be then effected upon the full number of needles constituting the group 15 to knit the back hand covering 12, also by reciprocating knitting forming selvages at opposite edges thereof, this knitting continuing to the lower end of the back hand covering, which end is substantially opposite the edge 14 of the front hand covering.

The examples of glove blanks illustrated in Figs. 1 and 2 embody tubular wrists formed integral with the strip composing the front and back hand and digit coverings, and in both cases said tubular wrist sections are attached integrally with the back hand covering 13.

Two forms of wrists are shown, the one embodied in Fig. 1 being of the fashioned and long wristed type, and the wrist section in Fig. 2 is of shorter formation and unfashioned, the purpose of the latter form being to provide a double section of fabric for the wrist, between which sections when the same is doubled within itself is secured the edge 14 of said hand strip, and thus providing a seam across the lower part of the palm of the hand. The tubular section 2 of the blank shown in Fig. 2 is formed during the rotary movements of the needle cylinder, the operation of the machine being shifted upon the completion of the back hand strip 13 from reciprocating to rotary knitting by the usual well known means, as fully described and shown in said Hemphill patent No. 933,443, said tubular wrist being produced upon the entire set of needles shown in Fig. 9.

To produce the fashioned wrist, illustrated in Fig. 1, the operation of the machine will be changed from reciprocating to rotary motion, as in the case of the tubular wrist of Fig. 2, but when said fashioned wrist is being knitted, instead of employing the full complement of needles, certain of said needles will remain out of action at the start to produce two sections of fabric 24 and 25, the section 24 being a continuation of the section 13 of the hand blank, while the section 25 will be the portion at the front of the wrist.

It has previously been stated that the number of needles employed in forming the hand strip was approximately one-third of the total number of needles in the machine, said total number being adequate to produce a tubular section of fabric large enough to fit the larger part of the arm, and in order that the wrist of the glove shall conform without wrinkling to the wrist which is considerably smaller than the largest part of the arm, it will be necessary to fashion the tubular section from the juncture 26 of the wrist and hand portions to the portion of said tube which covers the largest portion of the arm. One method of effecting the fashioning of said wrist is to knit the back section 24 of said wrist upon one-third of the needles, preferably the group 15, and the front strip 25 is formed upon a third of the entire mass of the needles, preferably the group 27, while the remaining third thereof is divided into two groups 28 and 29 disposed upon opposite sides of the cylinder and adjacent to the terminal needles of the series 15.

As knitting proceeds upon the groups 15 and 27 of the needles to produce the back and front sections of said wrist, the needles of the groups 28 and 29 are arranged to be gradually restored to action and thereby gradually reduce the gaps 30 and 31 formed in the tubular fabric by rotary knitting until the points 32 and 33 are reached, where the entire needles of said groups 28 and 29 will have been restored to action, following which knitting will proceed upon the full complement of needles to form the remaining portion 34 of the arm of said glove. It will be evident that where certain of the needles are withdrawn from action at opposite sides of the wrist, the adjacent opposite edges of the two sections 24 and 25 will be connected together by floating yarns 35, which floating yarns will be gradually shortened as said needles are brought into action, said floating yarns being subsequently removed and the edges connected thereby seamed together to complete the formation of the fashioned wrist.

The present machine embodies a single set of knitting cams 36 and in addition to said knitting cams other cams are provided which I designate generally as non-knitting cams and which comprise the cam for withdrawing all or certain groups of needles out of action, a cam for restoring all or certain groups of needles to action, and five cams for selecting the needles for the various groups to knit the digit strips.

The selecting cams may be caused to operate upon the needles in any suitable way, but for this purpose I provide below the needles and attached thereto jacks of six different lengths, one length being provided for the thumb group, as at 17, other lengths for the four fingers, as at 18, 19, 20 and 22, respectively, and another length, as at $28^2$ and $29^2$, for the wrist-fashioning needles. In this or in any other suitable manner the selecting cams will select and present to the knitting cam the proper group of needles for knitting each digit strip and for manipulating the other groups of needles as desired.

In order to knit the little or any other finger or thumb strip, means have been provided for first throwing out of action all of the needles, and then in restoring to action only the needles that are to be employed in knitting such strip. For this purpose I may provide any suitable means, and I will now briefly refer to the means for throwing all of the needles out of action at the desired time.

As shown in Fig. 6 I provide a needle throw-out cam 37 slidably mounted in a suitable support 39 and having a stem 40 operatively connected to or acted upon by, as through a pin 41, a bell-crank lever 42 pivoted at 43 and pivotally connected as shown in Fig. 3 with a rod 44, the lower end of which is pivotally connected to a lever 45 operatively associated with the pattern or cam drum $g$, the lever 45 being controlled by suitable cams thereon.

The ratio of the gears for reciprocating the needle cylinder, is such that said cylinder will be moved through an arc sufficient in extent to effect co-action between each of the groups of needles that are to be selected for operation during the reciprocation of the needle cylinder, and including the groups 17, 18, 19, 20 and 22, thus necessitating in the present case a movement at least in excess of one-third of the circumference of the cylinder, thereby providing sufficient movement of said cylinder to present each of the groups 17, 18, 19, 20 and 22 to the knitting cams and in addition by providing movement sufficient to effect the withdrawal of all the groups named.

The withdrawing of all the needles from action preferably takes place at the end of the knitting of the tubular section of fabric shown at 34 in readiness to begin the knitting of the hand strip at 14 upon the group 15 of the needles, and in order to accomplish this result by means of the cam 37, I provide the needles with long, medium and short knitting butts, the group 15 having long knitting butts 15', the group 27 having short length knitting butts 27', and the groups 28 and 29 having medium knitting butts 28', 29'.

It will be observed that the cam 37 is positively withdrawn from its active position against the needle cylinder by the lever 42 cooperating with the pin 41, and this withdrawing movement is in opposition to the action of a spring 46 which, upon the releasing of the pin 41 by the lever 42, yieldingly moves the cam 37 toward the needle cylinder. This movement of said cam is intended to take place when the series of short butts arrives in front of said cam and continues toward the cylinder until arrested just before it contacts with the short butts. Further movement of the needle cylinder causes the medium and long butts to engage said cam 37, the long butt needles being raised to their usual idle position by the incline 37' of said cam while the medium butts will be depressed below the casting off point of the loops by the incline 37² thereof, the depth of the latter being less than the length of the long butts and just deep enough to engage said medium butts and to prevent said medium butts from engaging the surface 37'. The arrest of the cam 37 in its direction toward the cylinder is effected by forming steps 37³ and 37⁴ in the block 37⁵ upon the drum $g$ which block controls the movements of the cam 37 through the instrumentalities hereinbefore described. After the long and medium butt needles have been withdrawn as described the cam 37 completes its movement toward the cylinder by being raised by the higher of the two steps 37⁴ and the incline 37', by said continued movement, is caused to engage and withdraw the remaining short butt needles; in other words to raise them to their idle level. After completing the withdrawal of the entire series of needles to their respective levels the cam 37 is withdrawn by the release of the cam block 37⁵ of the lever 53.

Following the above operation, the motion of the cylinder is changed from rotary to reciprocating movement for the purpose of knitting the hand strip 3. Means are provided for restoring to action all the needles necessary to knit said hand strip, that is all the needles of the series 15, said means herein embodying a cam 47 shown most clearly in Fig. 6. This cam is provided with a stem 48 slidingly mounted in a support 49 having a pin 50 upon which acts a bell-crank lever 51 which is itself pivotally connected to an upright rod 52 shown most clearly in Fig. 4 and connected at its lower end to a lever 53 which at its opposite end extends into proximity with the pattern or cam drum $g$, so as to be controlled by the proper cams thereon.

The cam or cams upon said drum $g$ whereby motion is imparted to the lever, is provided with separate and distinct steps 53', 53² and 53³. When the nose of the lever 53 is resting upon the step 53', the cam 47 will be in its completely withdrawn position and out of action with respect to the knitting butts of the needles as shown in Figs. 4 and 6. When the nose of said lever is resting against the second step 53², said cam 47 will have been moved toward the needle cylinder by the spring 92 just far enough to engage the ends of the long knitting butts 15', with the result that all the needles of the group 15 which have said long knitting butts will be restored to action, all of the other knitting butts remaining out of action so as to permit knitting to proceed upon said needles 15 to knit the hand strip beginning at the end 14.

When the nose of said cam lever 53 rests upon the third step 53³ of said cam, the restoring cam 47 will be permitted to move far enough toward the needle cylinder to engage the short length knitting butts 27' of the group 27, as well as the long knitting butts of the group 15, thereby restoring said short and long-butt needles to their operative positions and allowing the needles of the groups 28 and 29 to remain in their inoperative or idle positions.

To effect the selection of the needles necessary to form the several digit strips, I provide herein, as shown in Fig. 8, five cams 54, 55, 56, 57 and 58, the said cams selecting, preferably through the described butts upon the needle jacks, the needles that are to be employed in knitting respectively the thumb, the little finger, then in succession the third, second and first fingers. The said cams are herein shown as mounted, respectively, upon slides 59, 60, 61, 62 and 63 having wedge shaped heads 64, 65, 66, 67 and 68. Said slides are, respectively, connected pivotally to bell-crank levers 69, 70, 71, 72 and 73 which, as indicated in Fig. 3, are connected pivotally to upright rods 74, 75, 76, 77 and 78 extending downwardly to and pivotally connected with levers 79, 80, 81, 82 and 83 which extend into operative proximity to the cam or pattern drum $g$ and are controlled by suitably arranged cams thereon.

As previously stated, in the present embodiment of my invention I employ but a single set of knitting cams comprising four cams which are similar in construction to any one of the groups of knitting cams disclosed in my co-pending application Serial No. 263,284, filed November 20, 1918. In Fig. 6 I have indicated in plan a portion of said cams and have represented them as mounted upon a cam block 84 of any suitable type and herein carried by or supported upon the cam plate H in a manner generally similar to that shown in said Hemphill patent No. 933,443. The said cam block is not mounted for radial movement, though such movement may be employed therefor if desired.

It is sometimes desirable to fashion in and by the knitting operation each of the digit strips, and especially at the tips thereof, and in order that this may be accomplished means have been shown whereby such may be effected at a suitable time and, for example, when the knitting has progressed about to the bottom of the nails of the various fingers, the elevation or removal from action at the end of each movement of reciprocation a single needle, while permitting it to retain its loop, so that it may thereafter be restored in the subsequent widening operation. To this end I have herein represented two narrowing pickers 85 and 86, being indicated most clearly in Figs. 3 and 6, and which may be connected at any suitable part of the mechanism but are herein shown as pivotally mounted upon the cam block 84, said pickers being similar both in construction and operation to those shown in said Hemphill Patent No. 933,443, and application Serial No. 266,481, now Lawson Patent 1,401,712, dated December 27, 1921, to which reference may be had for further information concerning the same.

In the present embodiment of the invention a single set of yarn guides is arranged for cooperation with the knitting cams 36 to knit the various sections of the glove, and for the purposes of illustration I have, as indicated most clearly in Fig. 5, shown yarn guiding levers 87 as pivotally mounted upon a transverse pivot 88 in the latch ring C, said levers being controlled by suitable levers such as indicated at 89, and in a manner more fully described in said Hemphill Patent No. 933,443.

To effect the corresponding widening of the tips of the various finger and thumb strips, I have illustrated picker means embodying pickers 90 and 91 mounted at suitable points in relation to the needle cylinder and constructed and operated substantially the same as are corresponding pickers illustrated in said Patent 1,401,712, to which reference may be made for further information concerning the same.

Having completed the formation of the several digit strips, the next step in the formation of the glove, as hereinbefore stated, is to proceed with the knitting of the back hand strip, thus making it necessary to restore to action all of the needles of the group 15, which is effected by means of the cam 47, but to prevent said cam from moving the full extent of its movement toward the needle cylinder so as to operate upon all of the knitting butts, that is the long, short and medium butts 15', 27', 28' and 29', respectively, said cam 47 is limited in its movement, as in the case where knitting is started at 14 upon the front hand strip, that is the lever 53 is permitted to drop from the step 53' which is its normal position, to the step $53^2$. When the nose of the lever 53 is resting upon the step $53^2$, the restoring cam 47 will be at a distance from the cylinder sufficient only to engage the long butts 15' of the circular series of needles. Following the restoration of the group 15 of needles, the cam 47 will, by reason of the formation of the cam embodying said steps 53' and $53^2$, be restored to its inactive position.

Having completed by reciprocating knitting the formation of the hand strip to the point where the tubular wrist portion is to be started, the movement of the needle cylinder is changed from reciprocatory to rotary movement by the clutch-shifting mechanism hereinbefore referred to. Before knitting can proceed further, it is necessary to restore to action the needles of the group 27 whereon to knit the front section 25 of the glove wrist, which is accomplished simultaneously with the knitting of the back section 24. The needles of the series or group 27 are also restored to action by the cam 47, but inasmuch as the butts of said needles are of short length, the cam 47 must be moved toward the needle cylinder a slightly greater amount than in the previous case, and for this purpose the step $53^3$ has been provided which, when moved into alignment with the nose of the lever 53 by mechanism hereinafter described, allows said cam 47 to be moved by the spring 92 just the right amount to engage and restore said short butts 27'. Following the restoration of said short-butt needles, the cam 47 is withdrawn to its normal position by the proper movement of said drum $g$.

Knitting proceeds upon the two groups of needles 15 and 27 until it is desired to effect the fashioning of said strips, and to accomplish this result means are provided for gradually restoring to action the needles of the groups 28 and 29. The needles of these groups are not restored to action as groups, although they are withdrawn from action as groups, but the restoration thereof is effected preferably needle by needle, not by cams but by means herein shown as a picker 95, which for convenience has been mounted upon the base 96 of the knitting machine bed, (see Figs. 4 and 9).

While this picker may be of any suitable construction, I have herein shown a picker comprising an arm 97 having at its inner end a recess capable of receiving the desired number of butts, in the present instance one butt. The arm 97 is mounted upon a horizontal pivot 99 in a block 100, said block having a pivotal stud 101 arranged in a suitable socket formed in a suitable support. A suitable spring 103 is provided tending to depress the inner or active end of said picker and said end is guided upward against the stress of said spring by the peculiar formation of a recess 104 of a guide 105 arranged near the active end portion of said picker arm. The picker 95 is arranged to operate upon the jack butts 28² and 29² of the groups 28 and 29, respectively, and these jack butts are properly presented to the recess of said picker by a cam 106 secured to the guide 105, said guide being in the present instance supported upon the base 96 of the machine. The picker 95 is arranged to engage the butts of the needles 28 and 29, in the present instance only during the rotary movement of the needle cylinder. Thus said pick will engage the forward needles of each of said groups and continue the gradual restoration of said needles until the entire group has been restored to action.

When said picker is in its inactive position the inner or active end thereof may be positioned above the path of said jack butts so as to engage said butts only at the time when it is desired to effect the gradual restoration of the needles of said groups. In order to render said picker active, it is permitted to drop into a position where it will engage said butts. The spring 103 is allowed to act thereon by the movement of a member 107, indicated most clearly in Fig. 4. This member is attached to a lever 108 pivotally mounted upon the support for said picker and connected to an upright rod 109, which, in turn, is pivotally connected at its lower end to an arm of a lever 111 pivoted upon a stud 112 attached to a fixed part of the machine, said lever extending into operative relation to a suitable cam 111' upon the drum 113, shown most clearly in Figs. 3 and 4.

The drum 113 is similar to the drum disclosed in said Patent 1,401,712, whereby motion is imparted to the pickers for fashioning the tips of the fingers of the glove. Any suitable means may be employed to move said drum at proper intervals, and any suitable means may be substituted for said cam drum to control the movements of said picker and also of the pickers for fashioning said finger strips. Herein I have represented the said cam drum as loose upon the shaft $s'$, being held in position thereon between the cam drum $g$ and a collar 115 fast on the said shaft $s'$. Bolted to one side of the cam drum 113 by bolts 116 is a ratchet wheel 117 herein provided with thirty-six teeth. At one side of the ratchet wheel 117 and secured thereto and to the cam drum 113 by the bolts 116, is a ratchet wheel 118 which, in this embodiment of my invention, is provided with one tooth 144, as clearly indicated in Fig. 4. The said ratchets 117 and 118 are, of course, loosely mounted upon the shaft $s'$. As clearly shown in Fig. 3, the shaft $s'$ has fast thereon the usual ratchet wheel 119, herein provided with thirty-six teeth. This ratchet wheel is driven by a pawl mechanism not herein illustrated, and preferably the same as in the well known Banner machine and substantially the same as shown in said Hemphill Patent No. 933,443. The driving pawl for the ratchet 119 is controlled in its movement by a pivoted pawl-like member 120 suitably mounted and the movements of which are controlled by the usual pattern chain 121 in a manner not herein necessary more fully to describe. The pattern chain 121 is controlled in its movement by the usual ratchet wheel 122 loose upon the said shaft $s'$, the said ratchet wheel being driven in any usual manner not herein necessary more fully to describe, it being preferably the means employed in said Banner machine.

Upon the pattern chain 121 I provide a special lug or formation 123 adapted to periodically engage the end 124 of the pawl 125, which, as shown most clearly in Fig. 3, has an elongated shaft 126 mounted in the bearings 127, 128 in a bracket 129 supported upon the framing of the machine. At its end opposite the pawl 125 the shaft 126 is provided with a lug or arm 130 fast thereon and adapted periodically to be swung upward against the pawl 131 pivoted at 132 upon a lever arm 133 itself fast upon the usual quadrant shaft 134 for imparting movements of reciprocation to said needles. The tooth 135 of the pawl 131 is adapted to be lifted periodically by the lug or arm 130 so as to engage the tooth of the ratchet 117. When the lug or arm 130 is not elevated, the pawl 131 reciprocates idly and no movement is imparted to the ratchet 117 or to the cam drum 108 thereby. At the proper intervals, that is when it is desired to bring the widening picker into action, the pawl 131 is elevated momentarily and a slight movement of partial rotation is imparted to the cam drum 113 which, as shown in the diagram, Fig. 7, is provided with cams 136, 137, 138, 139 and 140 which cause the widening pick at the proper time to become active as previously stated.

Inasmuch as the cam drum 113 is loose upon the shaft $s'$, it is evident that means must be provided to preserve the same in its proper circumferential relation with respect to the cam drums $f$ and $g$. While any suitable means may be provided for this purpose, I have herein shown means whereby the cam drum $g$ when given a movement of partial rotation, correspondingly moves the cam drum 113, but in such a manner as to permit said cam drum to be itself moved ahead independently thereof through the ratchet wheel 117 and the pawl 131. For this purpose the cam drum $g$ has pivoted to the face thereof next the ratchet wheel 118 at 141 a pawl 142 normally pressed by a spring 143 into meshing relation with the ratchet 118 so as to engage the single tooth 144. It will be obvious that through the described construction the pattern or cam drum $g$ will impart to the cam drum 113 all its own movements of partial rotation and that the said cam drum 113 may be moved incrementally forward at the proper time so as to bring the proper cam into operative relation with the widening picker mechanism. In the diagram, Fig. 7, I have shown upon the pattern or cam drum $g$ and in their approximate relation the cams for controlling the movements of the non-knitting cams, and these cams are marked upon said figure for identification and need not be more particularly described.

It is obvious that the fashioning of the wrist of said glove may be varied so as to increase or decrease the length of the fashioned portion by varying the number of cams upon the cam drum 113, whereby the widening picker 95 is operated, or by increasing or decreasing the number of movements of the drum 113, or both, all of which are within the scope and purpose of my invention.

Having thus disclosed one illustrative embodiment of my invention, I desire it to be understood that although specific terms are employed they are used in a generic and descriptive sense and not for the purposes of limitation, the scope of the invention being set forth in the following claims:

1. A knitting machine having a needle carrier, a set of knitting cams, and means to reciprocate said needle carrier through an arc including a majority of the needles of said carrier to effect the knitting upon said needles of the hand, thumb and fingers of the glove.

2. A knitting machine having a circular series of needles, a revoluble carrier therefor, means to render said needles divisible into groups for knitting back and palm hand coverings and digit strips, a set of knitting cams, and means to reciprocate said carrier through an arc sufficient in extent to effect co-action between each of said groups of needles and said knitting cams.

3. A knitting machine having a circular series of needles, means for selecting predetermined groups of said needles to knit strips of fabric constituting back and palm hand coverings and digit strips of a glove blank, a set of knitting cams, and means to relatively reciprocate said series of needles to present each of said groups to said knitting cams.

4. A knitting machine having a circular series of needles, means for selecting predetermined groups of said needles to knit selvaged back and palm hand coverings and digit strips, a single set of knitting cams, and means to relatively reciprocate said series of needles to effect co-action between each of said needle groups and said knitting cams.

5. A knitting machine having a series of needles, a revolubly arranged carrier for said needles, a normally stationary set of knitting cams, means for revolving said needle carrier, means for separating said series of needles into groups for knitting back and palm hand coverings and digit strips, and means for reciprocating said needle carrier through an arc sufficient in extent to effect co-action between each of said groups of needles and said knitting cams.

6. A knitting machine having a series of needles, means to select predetermined groups of said needles for knitting digit strips, a normally stationary set of knitting cams, and means to reciprocate said series of needles relatively to said knitting cams a distance at least equal to the space occupied by the combined needles of said groups to effect the knitting thereon of selvaged digit strips.

7. A knitting machine having a circular series of needles, a revoluble carrier therefor, a normally stationary set of knitting cams, means to revolve said carrier relatively to said cams to effect the production of tubular work, means for selecting predetermined groups of said needles to co-act with said knitting cams for producing selvaged strips, means to effect reciprocation of said needle carrier through an arc at least equal to an arc including the needles of all of said groups, and a yarn guide for presenting yarn to the needles of all of said groups.

8. A knitting machine having a circular series of needles, a set of knitting cams, a yarn guide, means to knit upon all of said needles a tubular wrist, means to knit upon a portion of said needles strips of fabric constituting the front and back hand covering, means for selecting predetermined groups of said needles to knit thereon digit strips of fabric constituting finger coverings, and means to effect cooperation between each of said groups of needles and said knitting cams.

9. A knitting machine having a circular series of needles, a carrier for said needles, a single set of knitting cams, means to render said needles divisible into groups for knitting digit strips, means to effect relative reciprocating movement between said needle carrier and said knitting cams to knit selvaged digit strips upon said groups of needles, means to effect cooperation between said knitting cams and a plurality of said needles to knit distinct front and back hand coverings adapted to be subsequently seamed together along their edges, and means to effect knitting upon all of said needles to produce a tubular wrist.

10. A glove knitting machine having a circular series of needles, knitting cams, means to effect relative movement between said needles and said cams, means for effecting coaction between a group of said needles to knit a strip constituting front and back hand coverings, means for selecting predetermined groups of said needles to knit digit strips, means to effect knitting substantially simultaneously upon two opposed sets of needles to form front and back wrist coverings, and means for fashioning said wrist strips.

11. A glove knitting machine having a circular series of needles, knitting cams, means to effect a relative reciprocating movement between said cams and predetermined groups of said needles to knit a strip of fabric constituting hand and digit coverings, means to effect a relative rotary movement between said cams and selected groups of said needles to form two sections of fabric constituting the wrist of the glove, and means to gradually widen said sections of fabric.

12. A glove knitting machine having a circular series of needles, knitting cams, means to effect a relative reciprocating movement between said cams and predetermined groups of said needles to knit a strip of fabric constituting hand and digit coverings, means to effect a relative rotary movement between said cams and selected groups of said needles to form two sections of fabric constituting the front and back wrist coverings of the glove, and means for fashioning said wrist.

13. A glove knitting machine having a circular series of needles, knitting cams, means to effect a relative reciprocating movement between said cams and predetermined groups of said needles to knit a strip of fabric constituting hand and digit coverings, means to effect a relative rotary movement between said cams and selected groups of said needles to form integrally with one end of said strip two sections of fabric constituting the wrist covering of the glove, and means for fashioning said wrist covering.

14. A glove knitting machine having a circular series of needles, knitting cams, means to effect a relative reciprocating movement between said cams and predetermined groups of said needles to knit a strip of fabric constituting hand and digit coverings, means to effect a relative rotary movement between said cams and selected groups of said needles to form integrally with one end of said strip two sections of fabric constituting the wrist covering of the glove, and a picker adapted to effect the fashioning of said wrist covering.

15. A glove knitting machine provided with a circular series of needles, knitting cams, means to effect co-action between said cams and predetermined groups of said needles to form hand and digit coverings, means to effect knitting upon two groups of said needles to form front and back wrist coverings, and picking means adapted to pick into action the remaining needles of said series to effect the fashioning of said wrist covering.

16. A knitting machine having a circular series of needles, a carrier for said needles, a singe set of knitting cams, means to render said needles divisible into groups for knitting digit strips, means to effect relative reciprocating movement between said needle carrier and said knitting cams to knit selvaged digit strips upon said group of needles, means to effect cooperation between said knitting cams and a plurality of said needles to knit distinct front and back hand coverings, and means to effect relative rotary movement between the knitting cams and selected groups of the needles to form two distinct sections of fabric constituting the front and back wrist coverings of the glove.

17. A knitting machine having a circular series of needles, a carrier for said needles, a single set of knitting cams, means to render said needles divisible into groups for knitting digit strips, means to effect relative reciprocating movement between said needle carrier and said knitting cams to knit selvaged digit strips upon said group of needles, means to effect cooperation between said knitting cams and a plurality of said needles to knit distinct front and back hand coverings, means to effect a relative rotary movement between said knitting cams and selected groups of said needles to form two sections of fabric constituting the front and back wrist coverings of the glove, and means active during the knitting of said front and back wrist coverings to widen said coverings.

In testimony whereof, I have signed my name to this specification.

GEORGE P. BOSWORTH.